April 27, 1965     M. H. TUFT     3,180,073
MOWER
Filed Oct. 18, 1962     5 Sheets-Sheet 1
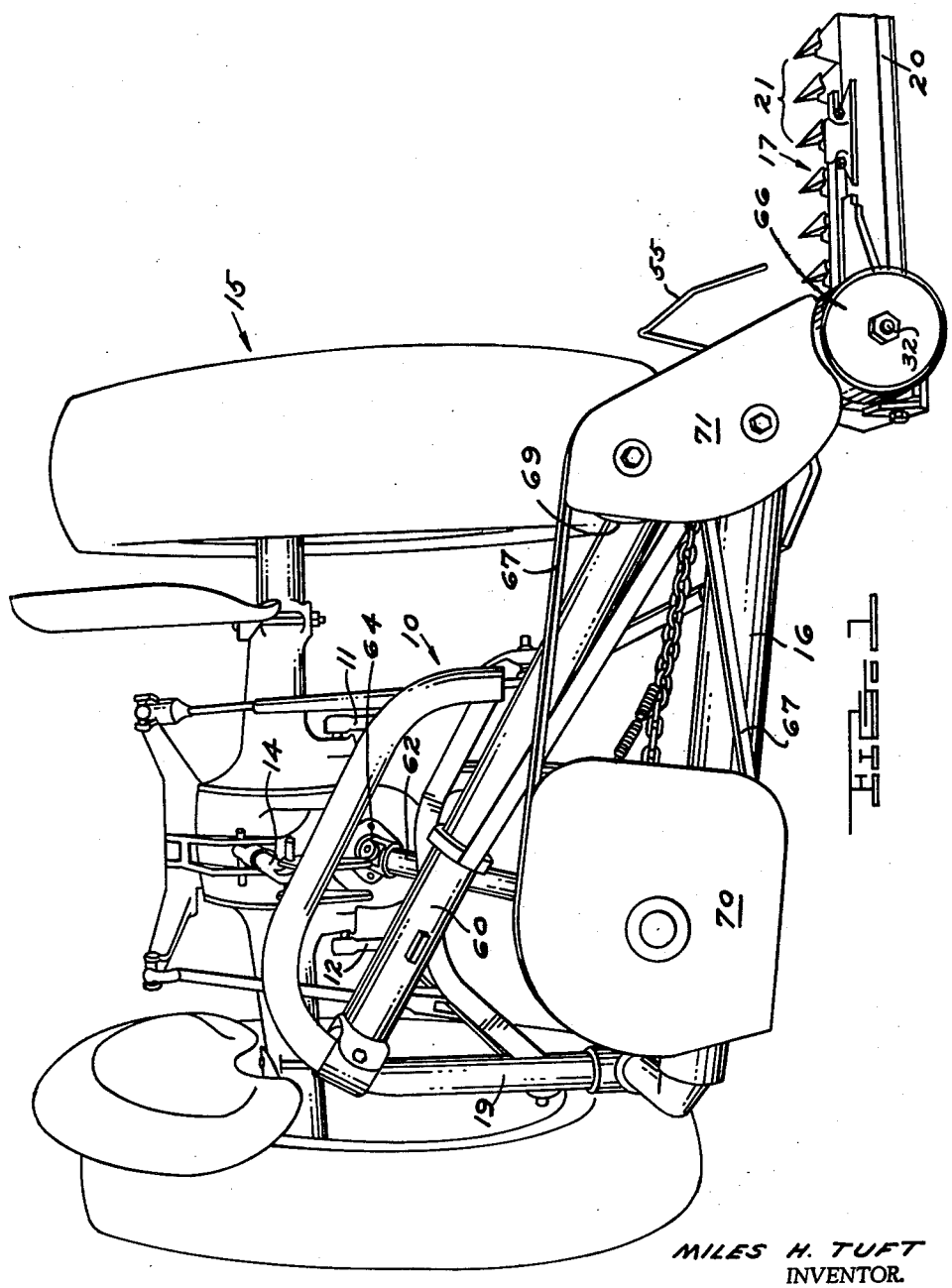
MILES H. TUFT
INVENTOR.
BY P. F. Hilder
ATTORNEY

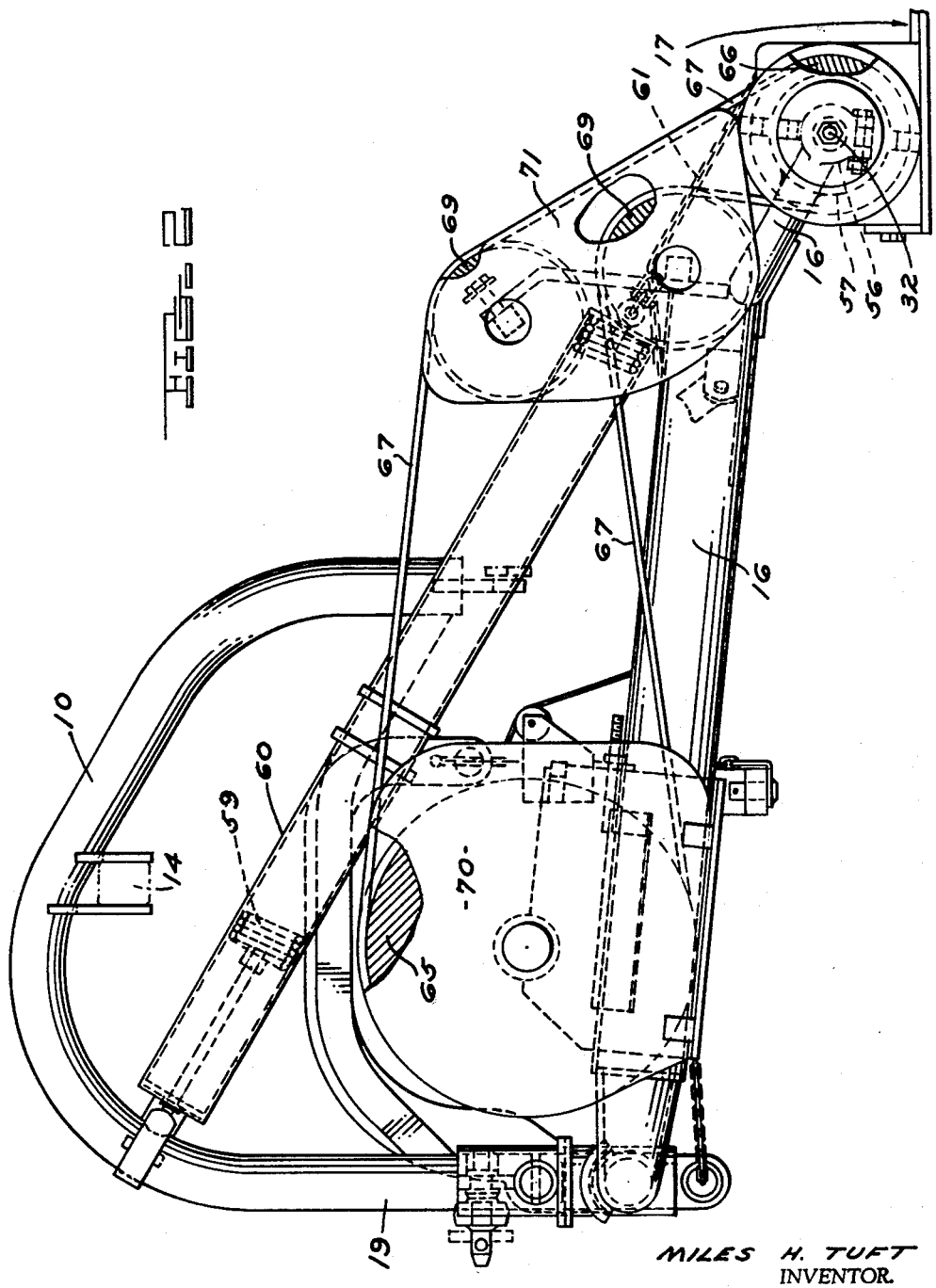

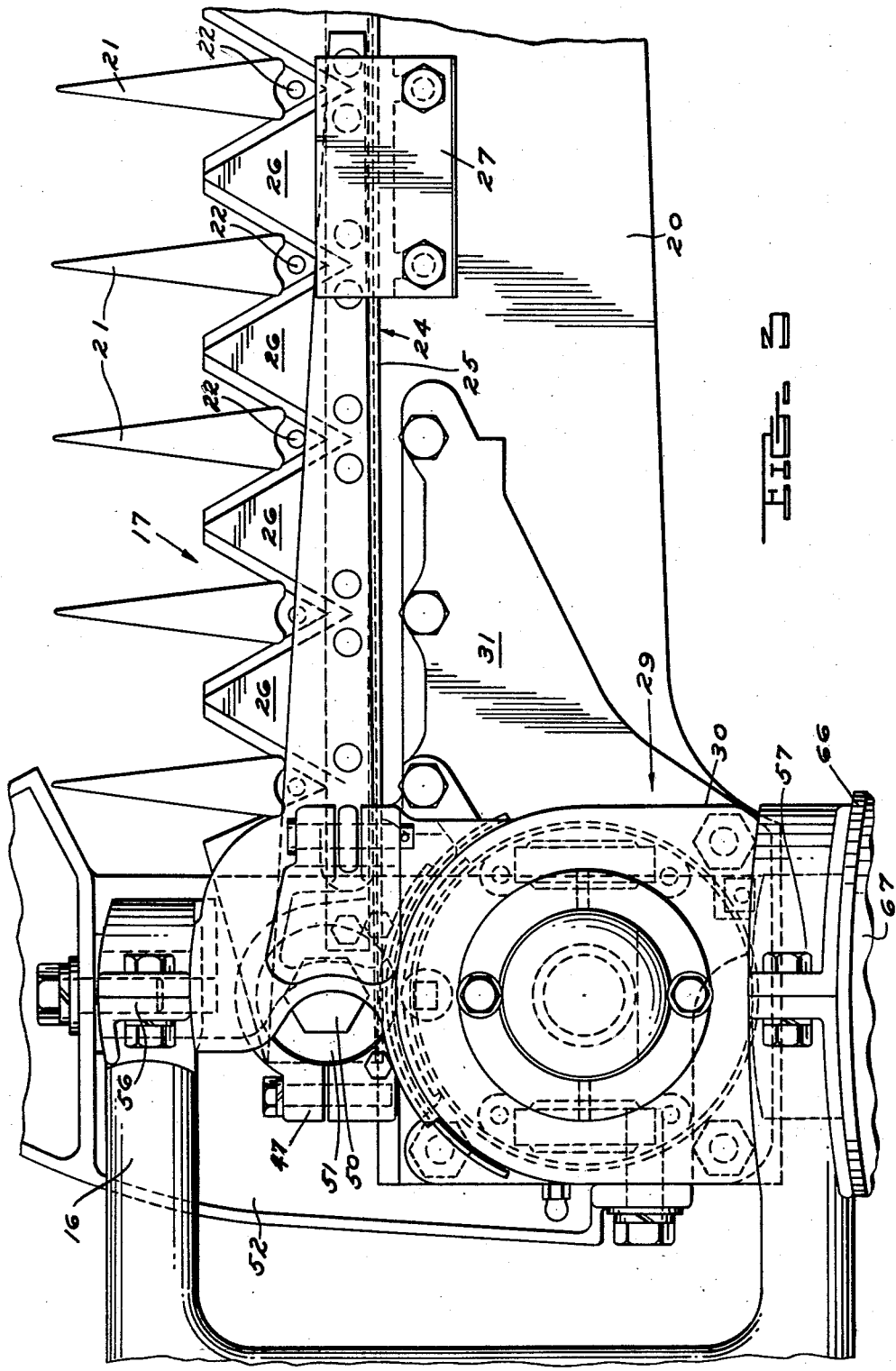

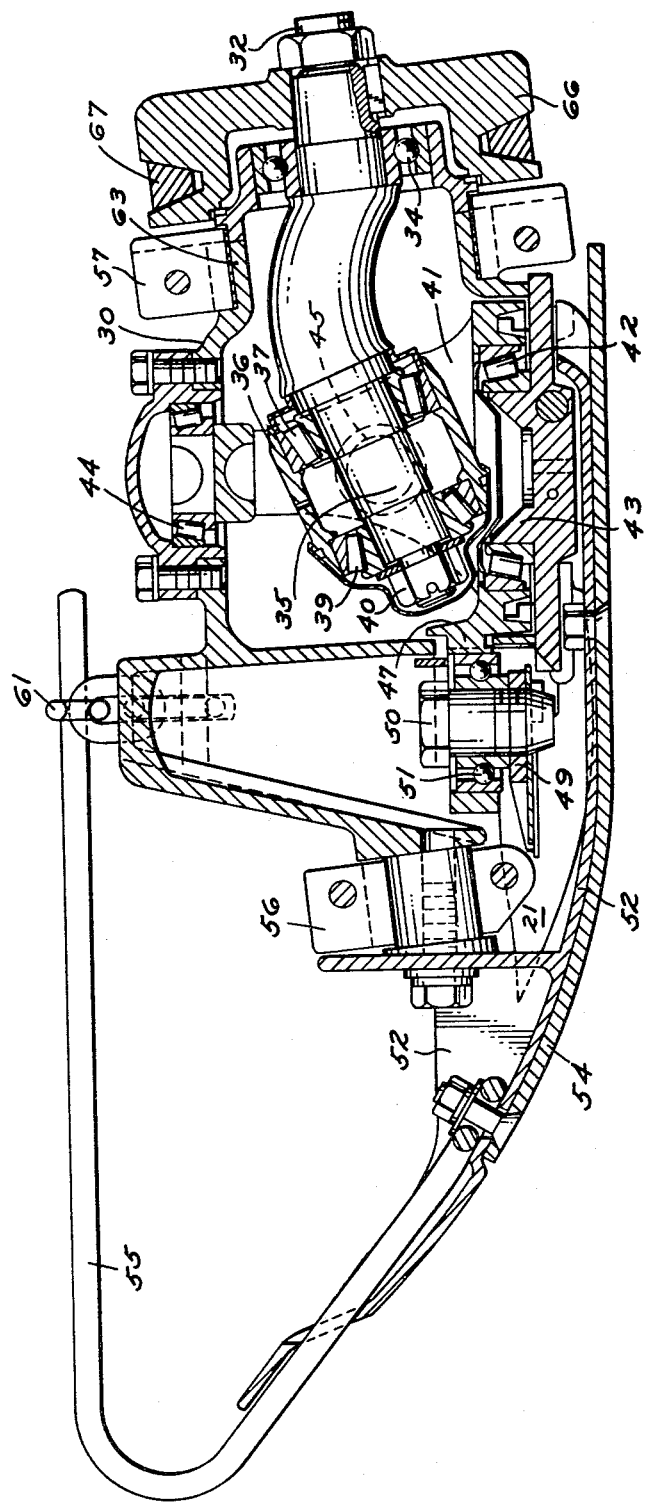

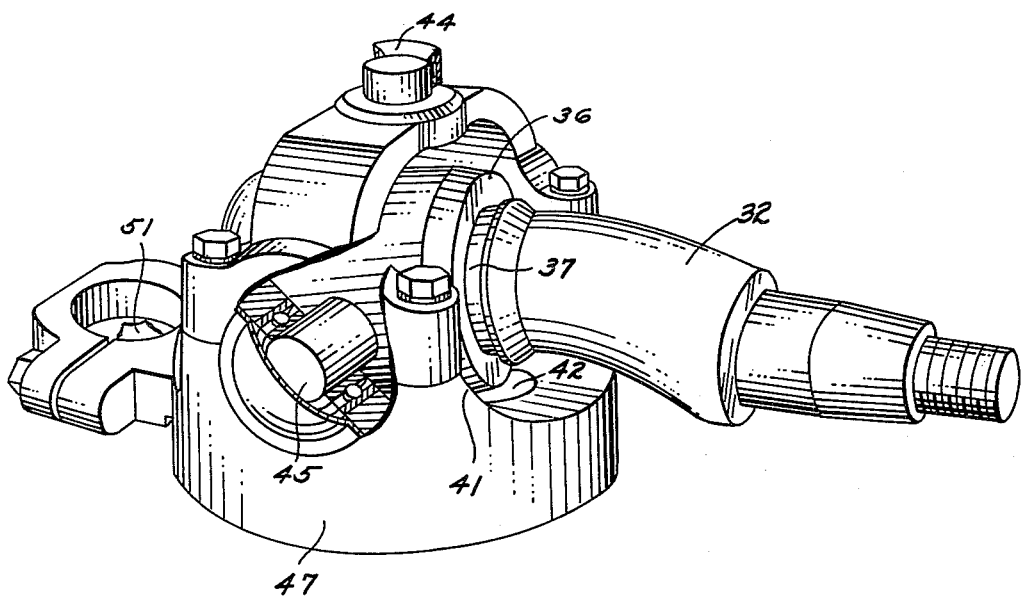

3,180,073
MOWER
Miles H. Tuft, Birmingham, Mich., assignor to Ford Motor Company, Dearborn, Mich., a corporation of Delaware
Filed Oct. 18, 1962, Ser. No. 231,364
7 Claims. (Cl. 56—296)

This invention relates to mowers of the sickle bar type, and, more particularly to a drive for such a mower.

Sickle bar mowers have a cutter bar which projects laterally at one side of the tractor, being supported by the mower framework. A knife is rapidly reciprocated along the cutter bar, the knife sections cooperating with the ledger plates to shear the crop.

The present invention relates to an improved mower drive for reciprocating the knife. The drive includes a wobble shaft and yoke, the wobble shaft being belt-driven from the P.T.O. shaft of a tractor. The wobble shaft is positioned to reduce vertical vibration of the cutter bar due to reciprocation of the knife and makes counterbalancing of the weight of the knife unnecessary and the mower drive yoke is carried directly on the inner end of the cutter bar. The invention also includes an improved belt drive providing greater ground clearance for the parts of the mower other than the cutter bar.

Among the objects of the present invention are to provide an improved mower drive which reduces vibration without the use of counterbalancers, which provides good ground clearance for the working parts, which is smooth, dependable and long lived, and generally to improve mower drives of the type described.

Other objects and objects relating to details of construction and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a rear perspective view of a tractor having a mower according to the present invention attached thereto.

FIGURE 2 is an enlarged rear elevation showing details of the drive to the mower.

FIGURE 3 is an enlarged top plan view of the drive head and the cutter bar, portions of these parts being broken away for convenience of illustration.

FIGURE 4 is a vertical section of the drive head and associated parts taken generally on the plane 4—4 of FIGURE 3. The mower drive of the present invention is shown incorporated in a rear-attached mower shown generally in FIGURE 1 for mounting on the links of a 3-point hitch tractor.

FIGURE 5 is an isometric view of the wobble shaft and yoke of the drive head and associated parts, a portion of the yoke being broken away to show details of construction.

Referring to FIGURE 1, the mower has a frame 10 adapted to be supported by lower links 11 and 12 and upper link 14 of a 3-point hitch tractor, generally designated as 15. A cutter bar support arm 16 is supported on the frame 10 and, in turn, supports a cutter bar assembly 17 and the driving mechanism for the cutter bar assembly, to be described later. The cutter bar support arm 16 is pivotally mounted on the lower end of the vertical frame portion 19 to permit the cutter bar assembly and support arm to "break back" in a more or less conventional manner upon the cutter bar striking an obstruction.

The cutter bar assembly 17 is of more or less conventional construction, including a cutter bar 20, on the forward edge of which guards 21 are attached. The guards 21 each include a ledger plate 22.

A knife is mounted for reciprocation along the cutter bar, the knife consisting of a knife back 25 to which knife sections 26 are secured. The knife is mounted on the cutter bar by knife clips, one knife clip 27 being shown. Cutting is provided by shearing action between the moving knife sections 26 and the stationary ledger plates 22, the knife being rapidly reciprocated for a distance equal to approximately the interval between the sections.

The knife 24 is driven by a drive head 29 mounted on the inner end of the cutter bar 20. The drive head 29 comprises a housing 30 mounted on the inner end of the cutter bar, which forms the bottom of the housing. Preferably, a mounting flange 31 of the housing projects for a short distance along the length of the cutter bar.

The wobble shaft 32 is journalled in the housing 30 for rotation on an axis extending in a fore-and-aft direction and forwardly downwardly inclined to the horizontal and to the general plane of the cutter bar 20. The wobble shaft is supported adjacent its rear end by an anti-friction bearing 34 and has a forward portion 35 centered on, but extending at an angle to, the axis of the shaft 32. A sleeve 36 is mounted for relative rotation on the portion 35 of the wobble shaft by a pair of anti-friction bearings 37 and 39 which may be held in position by a nut 40 threadedly engaged in the forward end of the shaft.

A yoke 41 is mounted for oscillation within the housing 30 about a generally vertical axis intersecting the axis of the wobble shaft 32. The yoke preferably is supported by anti-friction lower and upper bearings 42 and 44 located on the inner end of the cutter bar and the top of the housing 30. A boss 43 on the cutter bar supports the bearing 42.

The yoke 41 is connected with the sleeve 36 by a pair of trunnions 45 projecting from opposite sides of the sleeve and received within bearings in the mid-portion 46 of the yoke. The axis of the trunnions 45 intersects the axes of rotation of the wobble shaft and yoke and lies perpendicular to both of these axes, and the trunnions and yoke provide a support for the forward end of wobble shaft 32.

The yoke 41 has a forwardly extending lever portion 47 which is attached to the inner end of the knife by a knife head 49 and a bolt 50 extending through an anti-friction bearing 51 mounted within the lever portion. The arrangement is such that rotation of the wobble shaft 32 about its axis produces a like oscillation or wobbling movement of the sleeve 36 simultaneously in both a vertical plane about the axis of the trunnions 45 and in a horizontal plane about the axis of the yoke 41. The vertical component of oscillation of the sleeve has no driving function, but the horizontal component causes a similar oscillation of the yoke 41 about its axis so as to cause reciprocation of the knife 24.

The axis of the yoke 41 is perpendicular to the general plane of the cutter bar so that the lever portion 47 of the yoke is oscillated in an arc parallel to and a short distance above the cutter bar. The inner end of the knife is free to move fore and aft a short distance on the cutter bar so as to permit it to follow the arc of movement of the lever portion 47 of the yoke to which it is connected.

The drive head 29 and cutter bar are provided with a forwardly extending shoe 52 bolted to the housing 30. If desired, a sole 54 may be provided on the underside of the shoe to provide a wearing surface and a grass rod 55 may be provided at the forward end of the shoe to deflect the crop.

The cutter bar assembly 17 and drive head 29 are supported on the bifurcated outer end of the support arm 16 by a pair of cylindrical pivot bearings 56 and 57 extending about cylindrical, coaxial portions 58 and 63 on the outside of the drive head housing 51. The pivot bearings support the drive head and cutter bar assembly for oscillation about the axis of the wobble shaft 32 so that raising of the outer end of the cutter bar will not affect drive belt tension. The weight of the cutter bar is balanced by a spring 59 contained within a cylindrical guide 60 attached to the mower frame 10. The upper end of the spring 59 is adjustably secured to the guide 60 and the lower end of the spring is attached to a chain 61 engaged with the top portion of the drive head housing 30. The spring may be adjusted to give "float" to the cutter bar.

The mower is driven from the tractor P.T.O. shaft by a telescoping drive shaft 62 having universal joints at both ends, one universal joint 64 being shown. The drive shaft 62 drives a sheave 65 mounted on the support arm 16.

A combined flywheel and sheave 66 is keyed to the rear end of wobble shaft 32 and is connected with sheaves 65 by a V belt 67. The sheave 66 does not project below the shoe 52. The belt 67 is passed over a pair of idler sheaves 69 mounted on the support arm 16 to lead the belt on to sheave 66 from above to increase ground clearance of the lower run of the belt between the sheaves 65 and 66. Shields 70 and 71 may be placed in rear of the sheaves 65 and 69 to guard against accidental contact with the moving parts.

In operation, vibration of the cutter bar is produced by the rapidly reciprocated mass of the knife 24. Reciprocation of the knife tends to move the entire cutter bar assembly and drive head and is resisted by the support of the drive head in the pivot bearings 56 and 57. These forces act in a couple which tends alternately to raise and to depress the cutter bar assembly about its mounting on the support arm 16. By inclining the axis of the wobble shaft to the general plane of the cutter bar, the axis can be lowered at its forward end to pass only a short distance above the knife, thereby reducing the lever arm of the couple and reducing vibration. The construction makes it unnecessary to counterbalance the weight of the knife. The support on the lower yoke bearing 42 directly on the cutter bar and the positioning of the connection to the knife generally in the plane of the bearing 42 produces a rigid drive in which there is reduced tendency of the housing 30 to loosen from the cutter bar.

I claim:

1. In a sickle bar mower, a generally flat sickle bar, a knife mounted for reciprocation lengthwise of the sickle bar, a driving head mounted on an end of the sickle bar comprising a housing, a wobble drive within the housing including a wobble shaft journalled for rotation on a fore-and-aft extending axis, a sleeve journalled on a non-axially extending portion of the shaft, a yoke journalled in the housing for oscillatory motion on an axis perpendicular to the general plane of the sickle bar, means pivotally connecting the sleeve and yoke for relative oscillation on a horizontal transverse axis, and an arm extending radially from the yoke and connected with an end of the knife, the axis of the wobble shaft extending forwardly downwardly at an acute angle to the general plane of the sickle bar.

2. A sickle bar mower as claimed in claim 1, in which the driving head is supported for rocking movement about the axis of the wobble shaft.

3. In a drive for a reciprocating sickle bar mower, a driving head comprising a housing, a wobble drive within the housing including a wobble shaft journalled for rotation on a fore-and-aft extending axis, a sleeve journalled on a non-axially extending portion of the shaft, a yoke journalled in the housing for oscillatory motion on a generally vertical axis, trunnions projecting from opposite sides of the sleeve and received within bearings provided in the yoke to provide for relative oscillation on a horizontal transverse axis, and an arm extending radially from the yoke and adapted for connection to a sickle bar, the axis of the wobble shaft extending forwardly downwardly at an acute angle to the horizontal.

4. In a drive for a reciprocating sickle bar mower, a driving head comprising a housing, a wobble drive within the housing including a wobble shaft journalled for rotation on a fore-and-aft extending axis, a sleeve journalled on a non-axially extending portion of the shaft, a yoke journalled in the housing for oscillatory motion on a generally vertical axis, means pivotally connecting the sleeve and yoke for relative oscillation on a horizontal transverse axis, and an arm extending radially from the yoke and adapted for connection to a sickle bar, the axis of the wobble shaft extending forwardly and downwardly at an acute angle to the horizontal.

5. In a drive for a reciprocating sickle bar mower, a driving head comprising a housing, a cutter bar, the housing being mounted on the cutter bar, a wobble drive within the housing, including a yoke mounted on the cutter bar for oscillation within the housing, a knife extending along the cutter bar, and means connecting the yoke with the knife for driving the knife.

6. In a drive for a reciprocating sickle bar mower as claimed in claim 5, the cutter bar being generally flat and the yoke being supported in a bearing for oscillation on an axis perpendicular to the plane of the cutter bar and the connection for driving the knife lying generally in the plane of the yoke bearing.

7. In a drive for a reciprocating sickle bar mower as claimed in claim 5, the cutter bar forming the bottom wall of the housing.

References Cited by the Examiner
UNITED STATES PATENTS

| 2,824,416 | 2/58 | Orelind | 56—296 |
| 2,931,159 | 4/60 | Hill | 56—299 |

T. GRAHAM CRAVER, *Primary Examiner.*

RUSSELL R. KINSEY, *Examiner.*